Figure 3:
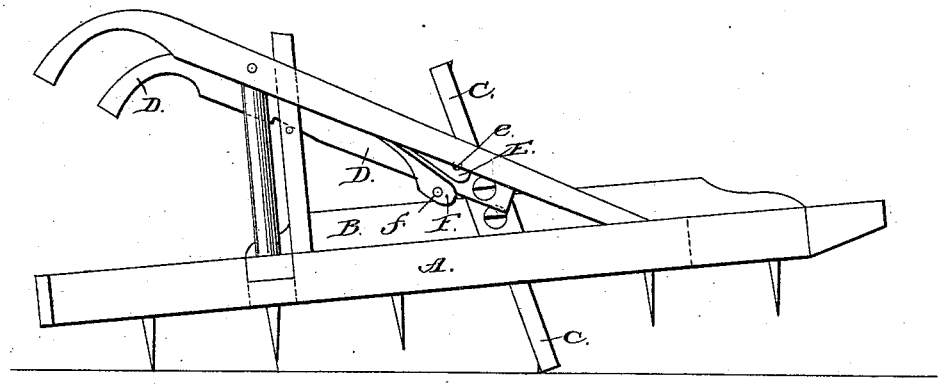

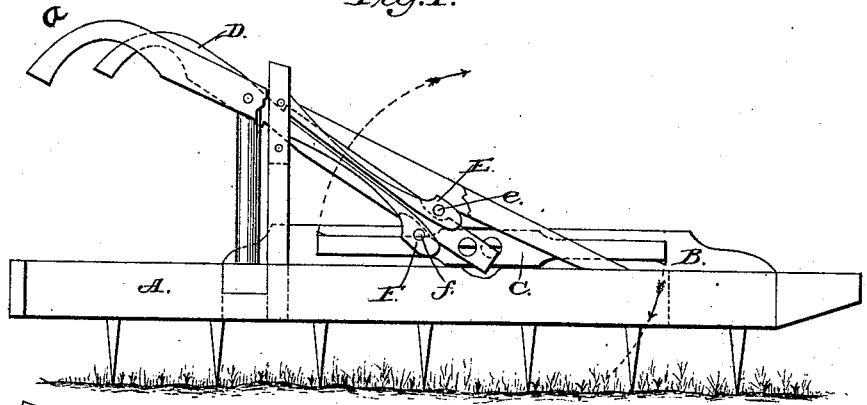
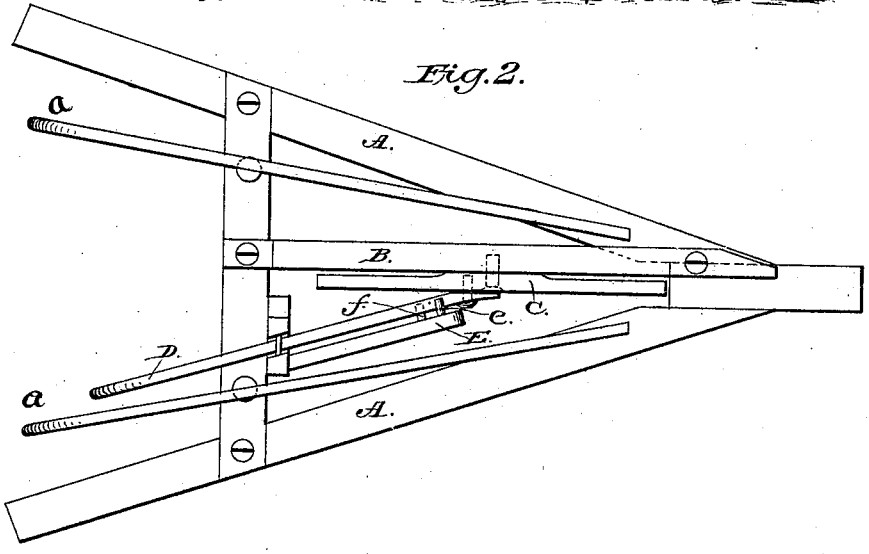

2 Sheets—Sheet 2.

J. T. VANAUSDAL.
Harrow.

No. 212,286. Patented Feb. 11, 1879.

WITNESSES
John A. Peters
John O'Donoghue

INVENTOR
J. T. Vanausdal
By H. J. Ennis
ATTORNEY

UNITED STATES PATENT OFFICE.

JAMES T. VANAUSDAL, OF SHELBYVILLE, TENNESSEE.

IMPROVEMENT IN HARROWS.

Specification forming part of Letters Patent No. 212,286, dated February 11, 1879; application filed December 16, 1878.

To all whom it may concern:

Be it known that I, JAMES T. VANAUSDAL, of Shelbyville, in the county of Bedford and State of Tennessee, have invented certain new and useful Improvements in Harrows; and I do hereby declare that the following is a full, clear, and exact description of the invention, which will enable others skilled in the art to which it appertains to make and use the same, reference being had to the accompanying drawings, and to letters of reference marked thereon, which form a part of this specification.

Figure 1 is a side elevation of a harrow having my improvement attached thereto. Fig. 2 is a plan view of same; and Fig. 3 is a side elevation, showing the operation of the invention.

This invention has relation to harrows; and it consists of improvements in the construction of the same, hereinafter more fully described, and particularly pointed out in the claim.

In the accompanying drawings, similar letters of reference indicate like parts of the invention.

A is a harrow, of the ordinary V-shaped form, provided with handles $a\ a$, to the center beam, B, of which is pivoted what I shall call, for want of a better name, a "tilter," C. This tilter C is simply a bar or beam pivoted to the center beam, B, so as to readily revolve in the direction shown by the arrows in Fig. 1. The lower end of the handle D is pivoted to the tilter C on one side of its center, and by means of said handle the tilter C may be operated.

Two springs, E and F, are secured to a standard, G, on the frame A, and extend parallel with the handle D, the lower ends of the springs being provided with pins $e$ and $f$, which act upon the handle D, the pin $e$ tending to press the handle down, and the pin $f$ counteracting and pressing it upward, thus holding the handle D in such a position as to secure the tilter C horizontally.

The operation of the device is as follows: When the harrow becomes clogged while in operation, the handle D is simply pressed down. The forward end of the tilter C falls and strikes the ground, which causes the harrow to rise bodily and the obstructions to drop out. The tilter makes a half-revolution and returns to its former horizontal position.

Having thus described my invention, what I claim as new and useful, and desire to secure by Letters Patent of the United States, is—

In a V-shaped harrow, the combination of the handles $a\ a$ and D, springs E and F, and tilter C, whereby the harrow may be raised bodily from the ground, substantially as and for the purpose set forth.

In testimony that I claim the foregoing as my own I affix my signature in presence of two witnesses.

JAMES THOS. VANAUSDAL.

Witnesses:
 JNO. T. CANOUSE,
 THOS. R. MYERS.